May 3, 1938.  S. P. VAUGHN  2,115,754
ROTATIVE WING SYSTEM
Filed June 24, 1935
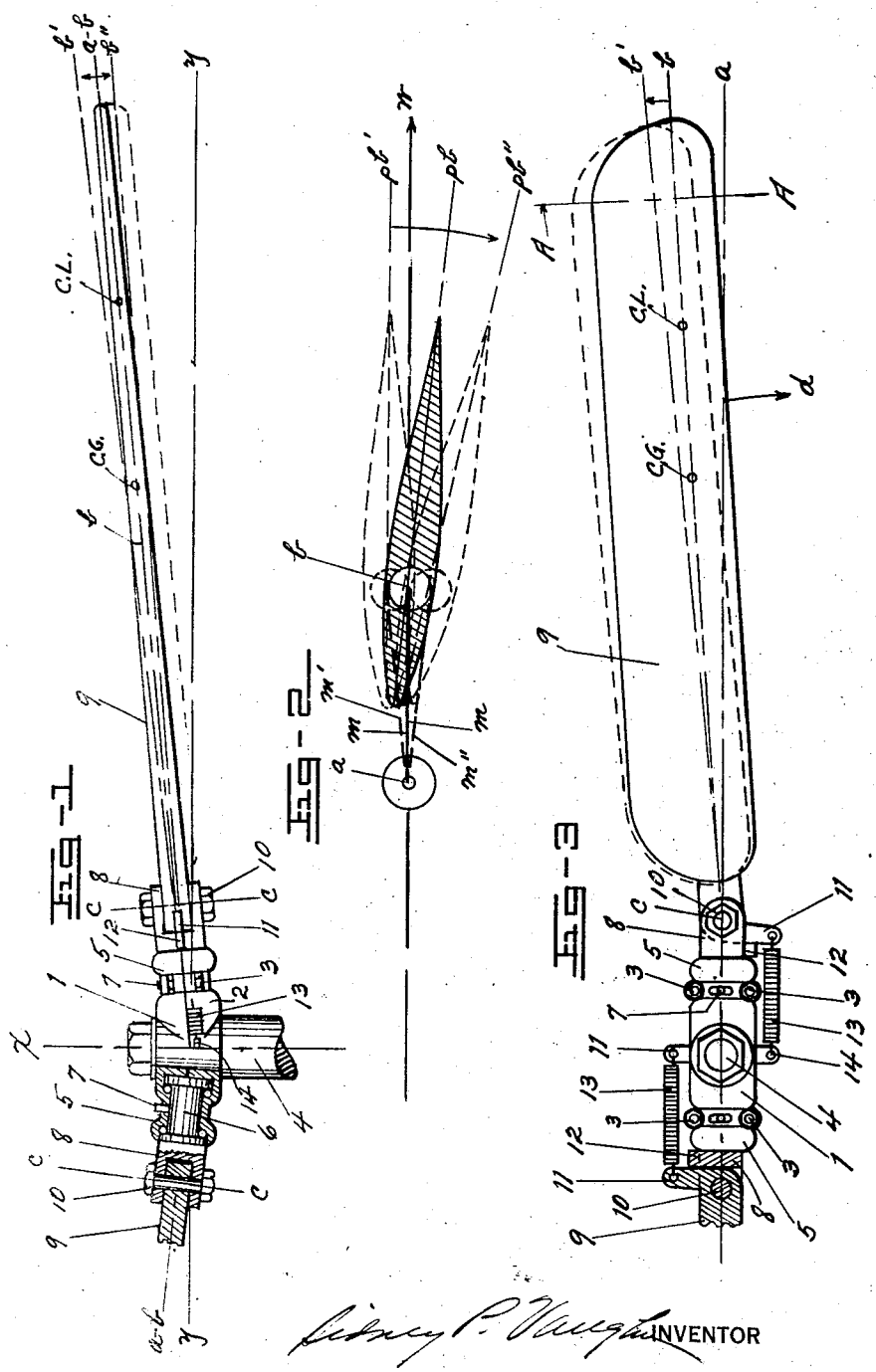

Patented May 3, 1938

2,115,754

UNITED STATES PATENT OFFICE 2,115,754

ROTATIVE WING SYSTEM

Sidney P. Vaughn, United States Navy, Ackerman, Miss.

Application June 24, 1935, Serial No. 28,159

7 Claims. (Cl. 244—18)

(Granted under the act of March 3, 1883, as amended April 30, 1928; 370 O. G. 757)

This invention may be manufactured and used by or for the Government for governmental purposes without the payment to me of any royalty thereon.

This invention relates to rotative wing systems for supporting aircraft in flight and to propellers for propelling aircraft. To simplify these specifications both will be referred to as "rotative wing systems".

In a propeller it is desirable that the pitch of the blades be increased as the speed of the aircraft increases so as to obtain a uniform thrust throughout the flight and to have the propeller act as an automatic speed regulator for the engine.

In rotative wing systems used to sustain aircraft of the helicopter and the freely rotative wing type, such as the autogiro, it is desirable that the lift on all blades be equal when in flight. When in forward flight the blade advancing into the wind has a greater velocity with relation to the relative wind than the receding blade, and unless the pitch of the blades is changed automatically to maintain an equal lift on all blades during a period of one revolution, the variation in lift tends to set up unbalanced moments which tend to throw the aircraft out of equilibrium.

The principal object of this invention is to provide a rotative wing system wherein the pitch of the blades is changed automatically, by the forces acting thereon, to obtain equal lift on all blades at all angular positions in the plane of rotation under all conditions of flight.

Another object is to provide in a rotative wing system a method of pivoting the blades to the hub whereby the blades will, during rotation, seek independently their own planes of rotation and dispose themselves along a line which is the resultant of the centrifugal force, lift force, and drag force acting upon the blades, and while seeking their own planes of revolution each blade will attain automatically a pitch in all angular positions which will equalize the pitch on advancing and receding blades.

I attain my objects by pivoting the blades independently of each other to the hub to turn on what may be termed a "feathering axis" extending radially from the hub in the direction of a line which is the resultant of the lift and centrifugal forces acting upon each blade when rotating rapidly in hovering flight or on a stationary platform, also by pivoting the root of each blade to its respective feathering axis to oscillate in the plane of rotation on an axis perpendicular to the feathering axis. When a rotative wing system having its blades pivoted to the hub as stated above is rotated rapidly the blades will rise slightly and rotate in a plane having the form of an inverted cone, and when in this position the angle between the plane of the cone and a plane at right angles to the axis of rotation is known as the coning angle of the blade, which coincides with a line which is the resultant of lift and centrifugal forces acting upon the blades. When the blades are rotated, the centrifugal, lift, and drag forces acting upon the blades increase as the square of the angular velocity of the blades, therefore, ignoring the weight of the blades, the coning angle of the blades will remain constant regardless of the angular velocity of the blades. When a rotative wing system is supporting an aircraft and it starts moving in translational flight a change takes place in the lift and drag forces acting upon the blades due to the difference in the velocity of the advancing and receding blade to the relative wind, but the centrifugal force will remain the same. With the construction described herein, this variation in lift and drag forces will cause a change in the coning and pitch angles of the blades to that necessary to equalize the lift forces on all blades.

The objects and advantages set forth above, together with such other objects and advantages as may be incident to the invention and apparent to those skilled in the art, are set forth in the following specifications and illustrated in the accompanying drawing, in which:

Fig. 1 is a side elevation of the rotative wing system, partially cut away on the center line to better illustrate the method of pivoting the blades to the hub.

Fig. 2 is a section on line A—A, Fig. 3, looking down the axis of the blade toward the hub, illustrating the various pitch angles the blade may attain.

Fig. 3 is a plan view of the rotative wing system shown in Fig. 1.

Like numerals and letters refer to like parts throughout the drawing.

A rotative wing system embodying the general principles of my invention is illustrated in the drawing. While I show only two blades it will be understood that any number of blades may be used. The axis of the hub is represented by the letter ($x$); a plane at right angles to the axis of the hub is designated by the letter ($y$); the direction of relative wind acting upon a section of the blade is designated by the letter ($w$); the feathering axis or the axis about which the blade rocks is designated by the letter ($a$); the axis of the blade is designated by the letter (b) (b') and (b''); the axis about which the blade oscillates in its plane of rotation is designated by the letter (c); the moment arm connecting the axis of the blade with its feathering axis is designated by the letter (m) (m') and (m''); the various pitches the blade may attain and the position of the blade axis in each position is designated by the letters (pb) (pb') and (pb''); the center of lift is designated by the letters CL; the center of gravity is designated by the letters CG.

A split hub, comprising an upper portion 1 and a lower portion 2, is securely clamped together by bolts 3. The hub is securely mounted on the end of a drive shaft 4 to rotate on its axis (x). While I show the wing system as being securely attached to the drive shaft, it will be understood that it may be adapted to rotate freely on a fixed shaft. Extending radially from the hub portion is a split journal bearing member 5 for each blade of the wing system, in each of which is a journal 6 mounted to turn or rock on an axis (a) extending in the direction of a line which is the resultant of the centrifugal and lift forces acting upon the blades when they are rotated rapidly as in hovering flight or on a fixed platform. The axis (a) of the journal will be referred to in these specifications and claims as the feathering axis of the blade. The turning of the journal in its bearings is limited to about fifteen degrees (approximately the difference between the maximum positive and negative pitch angle the blades will be required to pass through under most conditions of flight) by a stop comprising a pin 7 (see Fig. 3) fixed to the journal and extending through a slot in the wall of the upper bearing member. The outer end of the journal terminates in a forked member 8 in which the root end of the blade 9 is pivoted by a pin 10 to oscillate angularly in the plane of rotation on an axis (c) which is substantially perpendicular to the feathering axis (a) of the journal and the longitudinal axis (b) of the blade. The forward movement of the blade (in the direction of rotation as indicated by the arrow (d)) in the plane of rotation around the axis (c) is limited by an arm 11 extending forward from the root of the blade which makes contact with a stop 12 also extending forward from the forked member 8. The forward movement of the blade around the axis (c) is limited to that in which the longitudinal axis of the blade lies in the direction of a line in the plane of rotation which is the resultant of the centrifugal and drag forces acting upon the blade when the wing system is rotated rapidly, or to such a position that the center of gravity (CG) and the center of lift (CL) of the blade will always lie to the rear of an extension of the feathering axis (a) so that the centrifugal, lift and drag moments acting upon the blade will cause it to attain a pitch which will produce an equal lift on all blades during a period of revolution regardless of the angular position of the blade in the plane of rotation, as will be explained more fully hereinafter. A spring 13, connecting the arm 11 on the blade root to an arm 14 extending from the hub, is provided to hold the blade in its normal forward position when the wing system is not rotating, or, is rotating slowly. The tension of the spring is such, that when the drag forces acting upon the blade are above normal, the blade will move toward the rear and assume a position corresponding to a line in the plane of rotation which is the resultant of the centrifugal and drag forces acting upon the blade. The spring also acts as a shock absorber by permitting the blade to move to the rear when the driving torque is suddenly increased, thus reducing to a minimum excessive strains in the blade structure.

With the construction illustrated and described herein it will be noted that when the blade rises above or falls below its normal plane of rotation, a drag moment is brought into play which acts around the feathering axis and tends to turn the blade back to its normal position, which it is believed to be a very desirable feature, but which will not be discussed here.

Referring to Fig. 2, the small circle represents the journal or feathering axis (a) and the hatched portion a section of the blade on line A—A, Fig. 3, looking down an extension of the feathering axis (a). A moment arm (m) connects the feathering axis (a) with the longitudinal axis (b) of the blade, or the line of C. G. and C. L. In the normal position of the blade the moment arm (m) will lie parallel with a line (w) representing the direction of relative wind acting upon the blade. The blade, as represented by the shaded portion, has a pitch angle of about six degrees with reference to the moment arm (m), which represents the normal pitch of the blade when rotating in its normal plane of rotation, such as would be the case if the wing system was sustaining an aircraft of the helicopter type in hovering flight. Assuming such as the case, when the helicopter begins to move forward into the wind, the velocity of the blade advancing into the wind is much greater than that of the receding blade and both blades must change their angle of pitch in order that the lift of the blades may be equalized. Further assuming that the axis of rotation (x) is perpendicular to the line of flight, the feathering of the blade will be a periodic function of the angular position of the blade, and the blade advancing into the wind will rise because of the increased lift force acting thereon. As the blade rises above the normal plane of rotation it will turn counter-clockwise around its feathering axis and reduce its pitch to that necessary to obtain normal lift, as indicated by the axial line (b') in Fig. 1, and the chord line (pb') in Fig. 2, the angle of which is greatly exaggerated. Conversely, since the velocity of the receding blade is less than that of the advancing blade and less than its velocity in hovering flight, the blade will fall because of the reduced lift force acting thereon. As the blade falls below its normal plane of rotation, it will turn clockwise about its feathering axis, and increase the pitch of the blade to that necessary to obtain normal lift, as indicated by the axial line (b'') Fig. 1, and the chord line (pb'') in Fig. 2.

It will be noted in the drawing, Fig. 2, that I have selected an airfoil section in which the center of lift remains practically stationary. It may be desirable at times to use an airfoil in which the center of pressure moves toward the rear when the pitch angle is reduced, and moves toward the front of the airfoil when the pitch angle is increased, in order to produce a greater or less pitch by reducing or increasing the moment acting around the feathering axis.

The axial line (a) in Fig. 1 represents the feathering axis as well as the normal plane of rotation of the blade when rotating in hovering flight as the sustaining system of a helicopter. The axial line (b) in Fig. 3 represents its approximate angular position in the plane of rotation with reference to an extension of the feathering axis (a). The shaded section in Fig. 2, (enlarged and somewhat exaggerated) illustrates the pitch of the blade when rotating in its normal plane of rotation as stated above. It will be noted that the feathering axis (a), the longitudinal axis (b), and the moment arm (m) connecting the two, all fall in the same plane, which is the plane of rotation. When the blade is rotating in its normal plane of rotation, the pitch angle is positive to that plane as well as to the moment arm. This arrangement is essential to keep the plane of rotation on a line which coincides with the feathering axis (a). This feature distinguishes this type propeller or rotative wing system from any other employing a feathering axis to change the pitch of the blade, and it assists materially in reducing stresses in the blade structure.

From the foregoing it will be seen that the present invention provides a propeller or rotative wing system in which the blades are forced to change their pitch automatically without the intervention of the human element, under all conditions of flight. Variations in structure may be resorted to within the scope of the invention to obtain smoothness of operation. The device is rugged in construction, simple and automatic in action.

What I claim is:

1. A rotative wing system for aircraft including in combination a hub, blades articulated to the hub, each blade being pivoted to oscillate independently of the other blades in its own plane of rotation about the axis of the hub, means for limiting the oscillation of each blade in the direction of rotation to a position determined by the resultant of the centrifugal and drag forces acting upon the blade when rotated in still air, and a resilient member connecting the hub and blade for absorbing shock when the driving torque is suddenly increased.

2. A rotative wing system for aircraft including in combination a hub, journals mounted in the hub to turn on axes extending from the hub and lying in a plane acute to a plane at right angles to the axis of the hub, a blade mounted to each of the journals to oscillate independently of each of the other blades in the plane of rotation, and means for limiting such oscillation so that the center of lift and the center of gravity of each blade will always lie to the rear of an extension of the journal axis of each blade, and a resilient member connecting the hub and blade for absorbing shock when the driving torque is suddenly increased.

3. In a rotative wing system for aircraft having a hub and a blade, mechanism for mounting the blade on the hub including two pivots the axis of one of which is positioned to provide for blade movement in large part in the pitch changing sense and the axis of the other of which is positioned to provide in large part for lag and lead movements of the blade, and means for maintaining the blade in a lagging position with respect to the axis of said first pivot, to provide a component of blade movement in the flapping plane upon movement about the axis of said first pivot.

4. In a rotative wing system for aircraft having a hub and a blade, mechanism for mounting the blade on the hub including two pivots the axis of one of which is positioned to provide for blade movement in large part in the pitch changing sense and the axis of the other of which is positioned to provide in large part for lag and lead movements of the blade, and means for maintaining the blade in a lagging position with respect to the axis of said first pivot, to provide a component of blade movement in the flapping plane upon movement about the axis of said first pivot, the axis of said first pivot and the blade being inclined upwardly and outwardly at an inclination approximating a line representing the resultant of the lift and centrifugal forces acting on the blade in normal operation.

5. In a rotative wing system for aircraft having a hub and a blade, mechanism for mounting the blade on the hub including two pivots the axis of one of which is positioned to provide for blade movement in large part in the pitch changing sense and the axis of the other of which is positioned to provide in large part for lag and lead movements of the blade, and means associated with the second pivot and limiting forward blade displacement thereon to a position in which the blade is substantially lagging with respect to the axis of said first pivot.

6. In a rotative wing system for aircraft having a hub and a blade, mechanism for mounting the blade on the hub including two pivots the axis of one of which is positioned to provide for blade movement in large part in the pitch changing sense and the axis of the other of which is positioned to provide in large part for lag and lead movements of the blade, means associated with the second pivot and limiting forward blade displacement thereon to a position in which the blade is substantially lagging with respect to the axis of said first pivot, and yielding means normally urging the blade toward its forwardmost position of movement about the said second pivot.

7. In a rotative wing system for aircraft, the combination with a hub adapted to be secured to a drive shaft, of a plurality of blades articulated to the hub, pivotal means about which each blade may oscillate independently in its own plane of revolution as determined by the resultant of the centrifugal and drag forces acting upon the blades, means mounting each blade for feathering action to vary the pitch in either direction independently of the other blades, the feathering means for each blade including a bearing extending from the hub in the direction of a line determined by the resultant of the centrifugal and lift forces acting upon the blade when rotating normally, the pivotal means around which the blade may oscillate in the plane of rotation providing for such oscillation rearwardly from a point disposed rearwardly of an extension of the axis of the feathering bearing, and means for limiting the forward oscillation of the blade.

SIDNEY P. VAUGHN.